No. 650,535. Patented May 29, 1900.
J. P. HICKEY.
PNEUMATIC PROPELLER.
(Application filed Aug. 30, 1899.)
(No Model.)
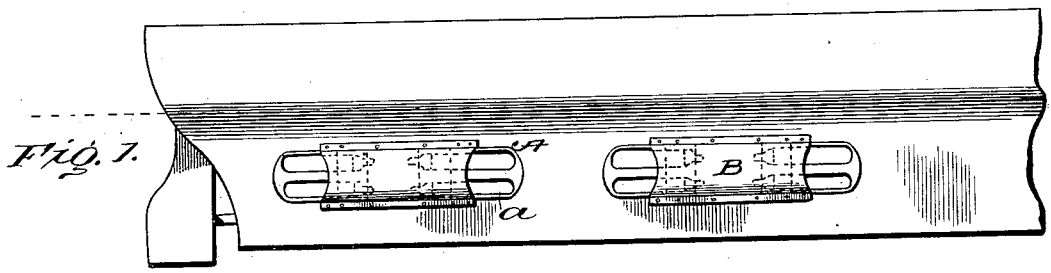
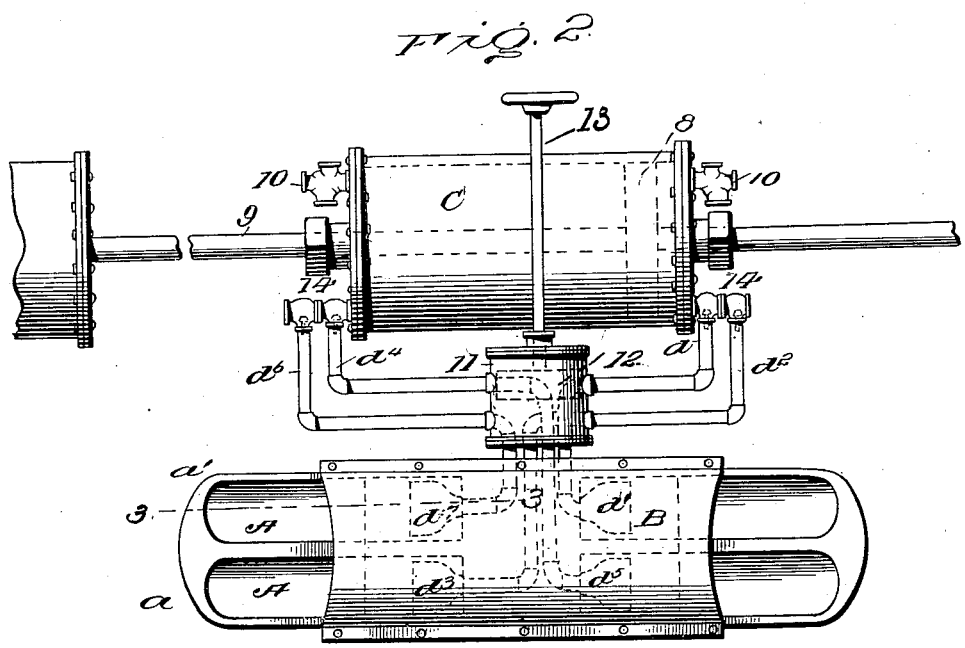
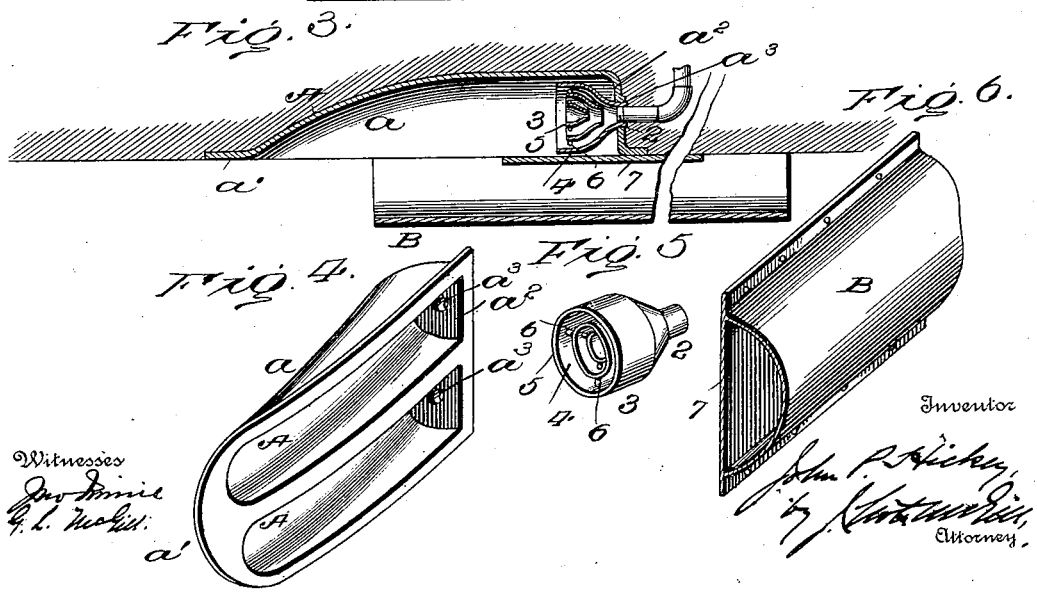
Witnesses
Inventor

UNITED STATES PATENT OFFICE.

JOHN P. HICKEY, OF WASHINGTON, DISTRICT OF COLUMBIA.

PNEUMATIC PROPELLER.

SPECIFICATION forming part of Letters Patent No. 650,535, dated May 29, 1900.

Application filed August 30, 1899. Serial No. 729,003. (No model.)

*To all whom it may concern:*

Be it known that I, JOHN P. HICKEY, of Washington, in the District of Columbia, have invented certain new and useful Improvements in Pneumatic Propellers; and I do hereby declare the following to be a full, clear, and exact description of the invention, such as will enable others skilled in the art to which it appertains to make and use the same.

This invention contemplates certain new and useful improvements in pneumatic propellers.

The object of the invention is to provide simple and improved means for effecting the propulsion of vessels by jets of air ejected from the sides of the vessel beneath the water-line in opposite direction to the travel of the vessel.

The improvement embraces an air-distributer so formed that a plurality of jets of air will be ejected simultaneously through separate passage-ways, so that the full propelling force of the air ejected against the water is obtained.

The invention will be hereinafter fully set forth, and particularly pointed out in the claims.

In the accompanying drawings, Figure 1 shows the application of my improvement to the side of a vessel, a portion only of the latter being indicated. Fig. 2 is an enlarged view in side elevation. Fig. 3 is a horizontal sectional view on line 3 3, Fig. 2. Fig. 4 is a view of one of the countersunk plates. Fig. 5 is a view of one of the air-distributers. Fig. 6 is a view, with a portion broken away, of one of the guide-plates.

Referring to the drawings, A A designate recesses formed in the side of a vessel below the normal water-line by countersunk plates $a$, each of which is curved longitudinally as well as transversely. Its outer end $a'$ coincides with the side of the vessel, while its inner end has a flat wall $a^2$, formed with a hole $a^3$. Within this hole fits the reduced end 2 of an air-distributer 3, to which is connected an air-pipe leading from any suitable means for supplying air under pressure. Each distributer 3 has a series of concentric passage-ways 4, all opening at the outer enlarged end of the distributer. The circular walls 5, by which these passage-ways are formed, are suitably braced by ribs 6. It will be observed that the inner ends of these walls are converged, so that the air in passing through the divergent passage-ways will be distributed over a greater surface or against a greater body of water than if ejected through contracted openings or in a single jet.

B designates a guide-plate secured to the side of the vessel, so as to extend over four associated recesses similar to the single recess before described. It is of semicylindrical formation and is provided with a flat plate 7, which is located adjacent to each air-distributer. These guide-plates are open at their ends, so as to permit water to pass between them and the sides of the vessel. The plates 7 serve to cause the water passing within the guide-plate B to enter the recesses A at points opposite to the discharge ends of the distributers, so that the air will strike directly against this water, enabling the full force of the discharged air to be exerted thereon.

In practice there are preferably four air-distributers and corresponding recesses in juxtaposition to each other, so that according as the vessel is being moved forward or backward air will be alternately ejected from two distributers facing in the same direction, air being supplied to only one pair of distributers at a time. When, however, the vessel is to be reversed, the passage-ways to the other pair of distributers are opened up and those previously employed are closed.

It is obvious that various means may be employed for forcing air to the distributers and regulating the passages to the two pairs of each set of distributers. I have shown in Fig. 2 a cylinder C, which may be mounted at any suitable point, having a piston 8 on a shaft 9, which may be a common shaft to several similar cylinders, according to the number of sets of distributers employed on a vessel. On the ends of cylinder C are air-inlet valves 10, which are opened only when the piston is moving from them, they being closed when the piston is on its return stroke. From each end of cylinder C extend two pipes, one leading to an air-distributer facing toward the stern and the other to a distributer facing in the direction of the bow. Only one pipe of each pair of pipes may be in use at the same time. The pipe $d$ leads to the forwardly-facing air-distributer $d'$, the pipe $d^2$ to the rearwardly-facing air-distributer $d^3$, the pipe $d^4$ to the forward air-distributer $d^5$, and the pipe $d^6$ to the rearward air-distributer $d^7$. In Fig. 2 I have indicated in dotted lines these several pipes as being continuous, but in point of fact they are not preferably so, since they all open into and lead from a common chamber 11, having a single valve 12 on a rod 13, the purpose of which valve is to close two of the pipes while the remaining two are open. Hence when the vessel is being moved forward air is alternately ejected through pipes $d^2$ and $d^4$ and out through the rearwardly-facing distributers on the ends thereof. On the other hand, when communication through these pipes is closed—that is, the admission of air through them is prevented—air is ejected through pipes $d$ and $d^4$ and their forwardly-facing distributers $d'$ and $d^5$. The piston-shaft may be reciprocated by any suitable means—that is, it may be connected direct to an engine or geared to the shaft of a propeller when the latter is also employed, as where additional propelling power is desirable.

In order to prevent water being drawn into the air-cylinders when the piston is on the reverse stroke relative to either end of the cylinder, small check-valves 14 may be used.

From what has been said it will be seen that any number of air-cylinders and corresponding sets of air-distributers may be employed on each side of the vessel. With each cylinder there is a set of four air-distributers, so that the vessel may be readily moved forward or backward, or it may be steered without regard to the rudder, and the air will always be distributed alternately through the distributers of the pair in use. It will be noted that the flat plates 7 serve to cause the water passing through the channels formed by the guide-plates to be deflected and enter the recesses or depressions in the sides of the vessel directly in front of the distributers, so that the air will act directly on the water. It will also be seen that the full striking force of the air against the water is obtained by providing each distributer with a plurality of flared concentric passage-ways.

I claim as my invention—

1. The combination with a vessel having a recess or depression in its side below the water-line, of an air-distributer at one end of such recess, a deflector-plate on the side of the vessel adjacent to such distributer, and means for forcing air through the latter, as set forth.

2. The combination with a vessel having a recess in its side, of an air-distributer at one end of such recess, means for supplying air thereto, a guide-plate extending over a portion of such depression and open at its ends, and a deflector-plate between such guide-plate and the distributer, as set forth.

3. The combination with a vessel having recesses in its side, and plates extending over portions of such recesses, of air-distributers between such plates, pipes leading from such distributers, and an air-cylinder into which said pipes open at opposite ends, as set forth.

4. The combination with a vessel having a plurality of recesses in its sides, of air-distributers, arranged in pairs, located in such recesses, pipes leading from each of such distributers to opposite ends of air-cylinders, and means for alternately opening and closing the passage-ways through two of the pipes at a time, as set forth.

5. The combination with a vessel having a recess or depression in its side below the water-line, of an air-distributer at one end of such recess, said distributer having a series of passage-ways and walls converged toward their inner ends, a deflector-plate on the side of the vessel adjacent to such distributer, and means for forcing air through the passage-ways of the latter, substantially as set forth.

In testimony whereof I have signed this specification in the presence of two subscribing witnesses.

JOHN P. HICKEY.

Witnesses:
GRAFTON L. MCGILL,
R. H. TUCKER.